UNITED STATES PATENT OFFICE 2,513,508

CARBON IMPREGNATED WITH SODIUM CYANATE AND COPPER OXIDE

Jacque C. Morrell and George T. Tobiasson, Chicago, Ill., assignors to the United States of America as represented by the Secretary of War No Drawing. Application May 1, 1942, Serial No. 441,271

2 Claims. (Cl. 252—431)

The invention described herein may be manufactured and used by or for the Government for governmental purposes, without the payment to us of any royalty thereon.

This invention relates to the improvement of adsorbent materials such as activated carbons for use as gas absorbents in gas masks and shelters. It relates more particularly to a process for depositing active catalysts upon adsorbent surfaces such as those of activated carbons to improve by chemical and catalytic means, as well as by adsorption means, the absorptive abilities of these materials to remove poisonous gases from gaseous mixtures.

By the absorptive properties of chars we mean all properties of the impregnated and calcined chars which enable them to remove poisonous gases and vapors from gas mixtures and particularly from air containing poisonous gases such as those of the type of arsine, hydrogen cyanide, cyanogen chloride, etc. Some of these gases may be retained by the char because of adsorption on its surface, while other gases are oxidized and thus rendered less harmful or harmless. In case of readily oxidizable gases as arsine, the impregnated and calcined char acts as an oxidizing agent or catalyst. In the latter case the oxygen of the air is utilized for oxidizing the poisonous gas.

Activated carbons which may be treated to improve their activities for removing poisonous gases and vapors from air are obtainable from several sources. Some of these activated carbons are referred to briefly as follows: Coconut charcoal is produced from coconut shells which are dried, then carbonized and activated at a temperature of from about 1600 to about 1700° F. in the presence of steam or of a mixture of steam and flue gas which may contain small amounts of air, and in some activation treatments air is used as such. Fruit pits are also convertible into activated chars by using similar methods. Other activated carbons, generally referred to as domestic or synthetic chars, are manufactured from coal, coke, wood, or wood charcoal or various mixtures of the same employing in some cases specific types of coal with or without the addition of wood char. Such carbonaceous materials are generally dried, ground to fine powder, mixed with a binder as pitch, and briquetted; after which the briquettes are crushed to give granular material of about 6 to 20 mesh particle size. The components may also be treated with various chemical reagents before mixing. Similarly wood may be treated with reagents such as zinc chloride and subsequently carbonized and activated. These granular materials in general are carbonized and activated following the general procedure mentioned for producing coconut char.

Copper oxide is a particularly important example of metal compounds which have heretofore been deposited on activated carbons to increase their abilities to remove poisonous gases from gaseous mixtures and particularly air-gas mixtures. A method previously used for depositing active copper oxide on an adsorbent comprises preparing a solution of a copper ammonium carbonate complex, impregnating the adsorbent with this solution, and subsequently heating to dry the impregnated material and to convert deposited salts to active copper oxide, especially to the cupric oxide. Thus, in an established practice, ammonia, carbon dioxide, and air are bubbled through a column of water and scrap copper for a more or less prolonged period of time until a solution is formed which by analysis is found to contain approximately 7 to 9 per cent by weight of copper, 10 to 12 per cent of ammonia, and 5 to 6 per cent of carbon dioxide. The adsorbent or char is impregnated with this solution by being wetted with or soaked in its and subsequently drained to remove excess solution, after which the impregnated material is heated or calcined to remove water and also to drive off carbon dioxide and ammonia which result from the decomposition of the copper ammonium carbonate complex deposited upon the adsorbent carbon or char. More recently it has been found that the absorptive properties of chars are improved by increasing the ammonia and carbon dioxide content of the impregnating solution either by fortifying the solution prepared as above described, or by preparing the solution synthetically from salts, such as basic copper carbonate and ammonium carbonate, ammonia, and water.

The absorptive ability of impregnated chars prepared as above indicated has been further improved in the prior art by secondary impregnation. Thus, char impregnated with copper ammonium carbonate complex and subsequently dried and/or converted has been further impregnated with a solution containing approximately 5.0 per cent by weight of sodium hydroxide and about 0.5 per cent of sodium thiocyanate, and has then been dried carefully to obtain a char having increased absorptive ability or capacity for gases such as cyanogen chloride. Although the absorptiveness of impregnated chars for poisonous gases has been increased further by the secondary impregnation, certain disadvantages have been incurred as a result of the secondary impregnation. It has been found, for example, that after the secondary impregnation the chars deteriorate in storage and take on moisture much more readily than do those which have been impregnated with only the copper ammonium carbonate complex. Because of this deterioration or hydration the absorptiveness of the char for arsine is greatly reduced, and under some conditions, particularly tropical conditions, the amount of moisture taken up is so large that the absorptiveness of the char for arsine is practically nil. The effects of this deterioration have also been noted to a varying degree in the decrease in absorption of other poisonous gases.

It is among the objects of the present invention to gain the advantages obtained heretofore by secondary impregnation of chars but at the same time to minimize or substantially eliminate the previously observed deleterious effects of the secondary impregnation. A further important object is to simplify the impregnation procedure by reducing the number of operations necessary to produce chars of high activities. Of great importance also is the fact that impregnating in a single stage or step produces an insoluble thiocyanate compound presumably copper thiocyanate, whereas later impregnation produces a product from which the sodium thiocyanate is readily removed by water. Further objects of the invention will become apparent in the following description.

In one specific embodiment the present invention comprises a process for preparing absorbents of high activity for removing poisonous gases from air which comprises forming a composite solution by adding to a solution of copper ammonium carbonate complex a thiocyanate substantially soluble therein, impregnating an activated carbon with said solution, and heating the impregnated material to remove water and volatile products to form an impregnated carbon of improved absorptive capacity for poisonous gases.

In a further embodiment, an alkaline material is also added to the above indicated composite solution employed for impregnating chars.

According to the simplified process of the present invention, which we herein refer to as an integrated process, improved gas absorbent chars are produced by means of a single impregnating step and a heating or calcining operation. The improved chars have also been shown to have different characteristics from the chars of the prior art when subjected to chemical analysis as will be described later.

In carrying out the process of the invention, a solution of copper ammonium carbonate complex, preferably with a relatively high ammonia content, is prepared and a water soluble thiocyanate is incorporated therein. Thus, a water soluble thiocyanate such as sodium thiocyanate for example, is dissolved in water to form a rather concentrated solution, such as a 25 to 50 per cent solution, and the sodium thiocyanate solution is then added gradually with stirring to the copper-containing solution. It has been found that if any precipitation occurs the precipitate is readily redissolved while the agitation or stirring is continued. The amount of thiocyanate added to the copper-containing solution may be upwards to 2.0 per cent by weight or more depending upon the type of charcoal to be impregnated and the product desired. Approximately 0.5 per cent of thiocyanate has given good results in many preparations. Further, a small amount of alkali may also be used in addition to the thiocyanate. When the amount of alkali added is too large, harmful effects are observed in the hydration characteristics of the charcoal produced. Thus we have observed, for example, that for some chars the addition of 5.0 per cent of sodium hydroxide is undesirable whereas the addition of approximately 1.0 per cent of sodium hydroxide apparently does not adversely affect the chars.

According to the process of our invention the adsorbent or charcoal to be impregnated is wetted with the impregnating solution in any desirable manner. Thus, for example, a char is soaked in the solution and the excess solution is removed from the impregnated material by draining. During such soaking or impregnation treatment the solution has usually been at a temperature between about 60° and about 140° F., although lower and higher temperatures may also be utilized. The wetted char is then directed to a drying and calcining treatment to remove moisture, to decompose the complex copper salts, and to remove the gaseous decomposition products which are mainly ammonia and carbon dioxide. Thus, the wet impregnated char may be introduced to a rotary dryer and gradually raised to a temperature of about 300° F. so as to effect the desired drying and conversion treatment. The maximum temperature used during drying and calcining varies somewhat with the type of char, the composition of the impregnating solution, and other factors, so that, in some instances, temperatures as high as 500° F. may be used for a short period of time without substantial detrimental effects to the impregnated char. More frequently, however, the temperature employed may be from about 275° to about 350° F. and care should be observed so that the char does not ignite in the presence of air at high temperatures as a result of the active metal catalysts deposited thereon. After cooling, the chars are packed in air-tight containers to exclude moisture and other absorbable contaminating materials.

It is apparent from the above description of the process that savings in equipment and labor costs are effected thereby since only a single impregnation treatment and a drying and calcining operation are necessary instead of a series of impregnations and drying steps which heretofore have been employed. Besides the above indicated advantages of the process, the impregnated and calcined char is a more effective gas absorbent than the product obtained from two-stage impregnation of the prior art as will be shown in subsequent specific examples. Char impregnated, dried and calcined according to the process of the present invention also has a longer active life and has a relatively low tendency to absorb moisture, to become sticky and to lose its activity to absorb poison gas. Impregnated chars of the types herein described are particularly effective in absorbing poisonous materials, particularly gases and vapors, under conditions of relatively high humidity.

It has also been found that the product of the integrated process is chemically different from that of the prior art. For example, when sodium thiocyanate is employed in a secondary impregnation, a substantial amount of the sodium thiocyanate may be extracted with water from the product of the two-stage impregnation whereas very little sodium thiocyanate is extractable from the product of our one-stage integrated impregnation. It may be that in the product of our process the thiocyanate is present as copper thiocyanate and that there is present less undecomposed copper carbonate salt. Factors such as those mentioned may account for the superiority of the product of the integrated impregnation.

The following examples are given to illustrate the integrated process of impregnating activated carbon and some of the results obtained in employing these materials for removing poisonous gases from air, although the data given are not intended to limit the broad scope of the invention.

*Example I*

An impregnating solution was prepared by bubbling ammonia, carbon dioxide, and air through a reactor containing water and copper wire to obtain an intermediate solution of copper ammonium carbonate complex found by analysis to contain 7.7 per cent by weight of copper, 8.0 per cent ammonia, and 4.6 per cent carbon dioxide. This intermediate solution was then fortified with aqueous ammonia, hydrated copper carbonate, and ammonium carbonate to produce a solution which upon analysis was found to contain approximately 10 per cent by weight of copper, 16 per cent ammonia, and 11 per cent carbon dioxide. Approximately 0.5 per cent by weight of sodium thiocyanate was introduced to this solution by gradually adding a 50 per cent aqueous solution of the thiocyanate to the copper impregnating solution while stirring. An activated coconut charcoal of 6 to 20 mesh particle size, suitable for gas mask use, was impregnated at about 60° F. with this solution and the excess solution was then drained off. During the impregnation the temperature of the char increased to about 70° F. The impregnated charcoal was then dried for several hours and gradually raised to a temperature of approximately 300° F. This impregnated and dried charcoal, when tested according to the official C. W. S. tube test procedure against mixtures of poisonous gas in air, had an arsine life of 147 minutes and a cyanogen chloride life of 76 minutes. A similar charcoal impregnated with a solution prepared as indicated but with the addition of 5.0 per cent by weight of sodium hydroxide had an arsine life of 80 minutes.

For comparison purposes other impregnated charcoals were prepared by employing the two-step impregnation process of the prior art in which the same untreated coconut charcoal was impregnated in the first step with the ammoniacal copper carbonate solution and then dried; while in the second step it was impregnated with a solution containing 5.0 per cent by weight of sodium hydroxide and 0.5 per cent of sodium thiocyanate and was again dried. The impregnated charcoal so obtained has an arsine value of only 62 minutes and a cyanogen chloride life of 82 minutes by the official C. W. S. tube test method. The coconut charcoal which was impregnated in the first step with the ammoniacal copper carbonate solution and dried, without any sodium thiocyanate being added, had an arsine life of only 82 minutes and a cyanogen chloride life of only 57 minutes.

*Example II*

In a further example of the process of the invention, the same type of untreated charcoal as used in Example I was impregnated with the same type of ammoniacal copper carbonate solution as above described to which was added 0.5 per cent by weight of sodium thiocyanate and 1.0 per cent by weight of sodium hydroxide. After drying and calcining, the resultant impregnated charcoal had an arsine life of 114 minutes and a cyanogen chloride life of 74 minutes.

It is apparent from the above data that an activated carbon impregnated in one step according to the process of this invention has a higher arsine life and substantially the same cyanogen chloride life as is obtained on the same types of charcoal impregnated in the two-step process of the prior art. This increase in arsine life is especially important since the arsine life drops off as the humidity of the charcoal and of the air is increased. The above data, which were obtained on relatively dry gas-air mixtures, thus indicate the performance of these impregnated charcoals under temperate climate conditions.

*Example III*

In order to show the effect of increase in humidity, the above mentioned impregnated chars prepared as described in Examples I and II were subjected to contact with a current of air of approximately 50 per cent relative humidity at 25° C. until the chars reached an equilibrium weight. The results obtained for the arsine life of these chars when dry and wet (that is, after humidification), are shown in the following table:

| Process | Impregnating Solution Containing Per Cent by Weight of— | | Arsine Life, Minutes | | Per Cent by Weight Water Present in Wet Char |
|---|---|---|---|---|---|
| | NaCNS | NaOH | Dry Char | Wet Char | |
| Prior art, two-stage impregnation; (1) copper ammonium carbonate solution and (2) solution containing sodium thiocyanate and sodium hydroxide | 0.5 | 5 | 62 | 1 | 24.5 |
| Present invention, one-stage (integrated) impregnation with copper ammonium carbonate solution plus sodium thiocyanate and sodium hydroxide | 0.5 | 5 | 80 | 2 | 18.0 |
| | 0.5 | 1 | 114 | 10 | 20.7 |
| | 0.5 | 0 | 147 | 51 | 16.1 |

It will be observed from the data in the table that the products of the process of the present invention do not take on water as readily on humidification as does the char of the prior art. Of greater importance, however, is the fact that the chars of the present invention after being subjected to humid conditions, have far greater absorptiveness for arsine than does the humidified char of the prior art.

These chars have also been tested for their absorption of other poisonous gases and it has been found that the absorptive capacity for these gases has not been depreciated as a result of the treatment of the present invention and that for some gases there has been improved absorption when the chars have been used both in the dry and in the humidified condition.

The character of the invention and the type of results obtained by its use are evident from the preceding specification and examples, although they are not to be construed as to impose undue limitations upon the generally broad scope of the invention.

We claim as our invention:

1. A catalytic absorbent particularly adapted for removing both arsine and cyanide chloride from gas contaminated therewith, said absorbent being inclosed in an air tight container in a condition ready for later use in a gas mask or the like and being an activated carbon impregnated in a single step impregnation process with an integrated solution, said solution including about 0.5 percent sodium cyanate and consisting of an admixture of an aqueous copper ammonium complex consisting of from 70 percent to 80 percent water, from 5 percent to 11 percent of copper, from 8 to 15 percent ammonia and from 3 to 8 percent carbon dioxide and an aqueous solution consisting of from about 50 to 75 percent water, and of from 25 to 50 percent sodium tricyanate, said carbon being first dried, then heated for more than an hour at a temperature of from about 275° F., to about 350° F., and finally sealed in an air tight container.

2. A catalytic absorbent particularly adapted for removing both arsine and cyanogen chloride from gases polluted therewith; said absorbent consisting of an impregnated activated carbon sealed in a condition ready for later use in a gas mask or the like, said carbon being impregnated in a single step process with an integrated solution containing about 1.0 percent sodium hydroxide and about 0.5 percent sodium thiocyanate and consisting of an intimate mixture of an aqueous copper ammonium complex solution containing from 70 to 80 percent water, from 5 to 11 percent copper, from 8 to 15 percent ammonia, and from 3 to 8 percent carbon dioxide and an aqueous solution containing from 25 to 50 percent sodium thiocyanate and an aqueous solution of sodium hydroxide, said carbon being then dried, then heated for more than an hour at a temperature of from 275° F., to 350° F., and thereafter sealed in an air tight container.

JACQUE C. MORRELL.
GEORGE T. TOBIASSON.

REFERENCES CITED

The following references are of record in the file of this patent:

UNITED STATES PATENTS

| Number | Name | Date |
| --- | --- | --- |
| 1,519,470 | Wilson | Dec. 16, 1924 |
| 1,540,447 | Wilson | June 2, 1925 |
| 1,995,274 | Eversole | Mar. 19, 1935 |
| 2,212,593 | Dittrich | Aug. 27, 1940 |